United States Patent
Beebe et al.

(10) Patent No.: US 6,439,070 B1
(45) Date of Patent: Aug. 27, 2002

(54) RIB ASSEMBLY FOR A CRASH TEST DUMMY

(75) Inventors: Michael S. Beebe, Norwalk; John D. Duncan, II, Port Clinton; Barry L. Wade, Milan, all of OH (US)

(73) Assignee: Applied Safety Technologies Corporation, Milan, OH (US)

( * ) Notice: Subject to any disclaimer, the term of this patent is extended or adjusted under 35 U.S.C. 154(b) by 0 days.

(21) Appl. No.: 09/426,267

(22) Filed: Oct. 25, 1999

(51) Int. Cl.$^7$ ........................................... G01M 17/007
(52) U.S. Cl. ............................................. 73/866.4
(58) Field of Search ....................................... 73/866.4

(56) References Cited

U.S. PATENT DOCUMENTS

| | | | | |
|---|---|---|---|---|
| 4,261,113 A | * | 4/1981 | Alderson | 73/866.4 X |
| 4,701,132 A | * | 10/1987 | Groeich et al. | 73/866.4 X |
| 5,317,931 A | * | 6/1994 | Kalomi | 73/866.4 |
| 5,526,707 A | * | 6/1996 | Smrcka | 73/866.4 |
| 5,741,989 A | * | 4/1998 | Vigro et al. | 73/866.4 |

FOREIGN PATENT DOCUMENTS

DE 3715143 C1 * 9/1988 ................... 73/783

* cited by examiner

*Primary Examiner*—Thomas P. Noland
(74) *Attorney, Agent, or Firm*—Brinks Hofer Gilson & Lione

(57) ABSTRACT

An improved rib assembly for a crash test dummy includes a U-shaped outer member which simulates a pair of ribs secured to a spine and a pair of transverse assemblies disposed in parallel and coupled between such opposed ribs. A first assembly is a spring centered damper which provides simulated resistance to displacement of one rib relative to another. A second assembly includes a spring biased piston and cylinder that provides simulated positioning of the rib ends. A sensor disposed generally between the two assemblies measures the displacement of one of the pair of ribs relative to the other. The piston rod is supported upon a pair of linear ball bearing assemblies which maintains alignment between these two assemblies and ensures accurate responsive motion therebetween without binding and thus accurate measurements of displacement. A plurality of U-shaped rib assemblies, typically three, may be utilized to simulate a rib cage in a crash test dummy.

13 Claims, 4 Drawing Sheets

RIB ASSEMBLY FOR A CRASH TEST DUMMY

BACKGROUND OF THE INVENTION

The invention relates generally to components for crash test dummies and more specifically to an improved rib assembly for securement to a spine of a crash test dummy which may be used in multiples.

Beyond calculations and projections from known data, safety design for automobiles has long relied and will likely continue to rely upon the results of actual crash tests. Notwithstanding the increasing application of super computers to this task, real world, controlled and highly instrumented crashes to test both prototype and production vehicles will continue. The complement to such testing is the crash test dummy, a mannequin or simulated human form, which attempts to approximate, as closely as possible, the skeletal, muscular and organic construction of the human body. It is entirely reasonable to state that the sophistication of crash test dummies has increased commensurately with the increased emphasis on safe motor vehicles and the sophistication of data recovery from crash tests.

Perhaps the most single common raw data recorded from a crash is the displacement of vehicle structure and components as well as the displacement of crash test dummy components relative to one another. While the data recorded is typically displacement, it is recorded over time and such displacement over time is readily conditioned or recomputed to provide both speed and acceleration of such components.

Such displacement typically is measured along a single linear path or two orthogonal paths. Given the often oblique or random direction of forces relative to an axis of a linear sensor, it is apparent that forces may frequently be generated which tend to interfere with the smooth, linear operation of a component and its sensor. Such oblique or transverse forces can frequently result in binding of a component and its sensor which manifests itself in reduced linear travel and thus reduced measured displacement and computed speed and acceleration. This is a particular problem in the larger structures of a crash dummy such as the rib cage where opposed left and right ribs are separated by several inches and oblique or transverse forces may cause binding of the simulation mechanism and significantly impair accurate measurement of displacement and associated variables.

Accordingly, rib assemblies that exhibit improved resistance to binding caused by oblique or transverse forces would be highly desirable. The present invention is directed to such a device.

SUMMARY OF THE INVENTION

An improved rib assembly for a crash test dummy includes a U-shaped outer member which simulates a pair of ribs secured to a spine and a pair of transverse assemblies disposed in parallel and coupled between such opposed ribs. A first assembly is a spring centered damper which provides simulated resistance to displacement of one rib relative to another. A second assembly includes a spring biased piston and cylinder that provides simulated positioning of the rib ends. A sensor disposed generally between the two assemblies measures the displacement of one of the pair of ribs relative to the other. The piston rod is supported upon a pair of linear ball bearing assemblies which maintains alignment between these two assemblies and ensures accurate responsive motion therebetween without binding and thus accurate measurements of displacement. A plurality of U-shaped rib assemblies, typically three, may be utilized to simulate a rib cage in a crash test dummy.

Thus it is an object of the present invention to provide rib components for a crash test dummy which exhibit improved performance when subjected to oblique and transverse forces.

It is a further object of the present invention to provide rib assemblies for crash test dummies having linear ball bearing assemblies which support transversely telescoping members.

It is a still further object of the present invention to provide a rib assembly for crash test dummies which may be used in multiples in a crash test dummy.

It is a still further object of the present invention to provide a rib assembly for a crash test dummy which provides improved displacement measurements during crash tests.

Further objects and advantages of the present invention will become apparent by reference to the following description and appended drawings wherein like reference numbers refer to the same component, element or feature.

DESCRIPTION OF THE PREFERRED EMBODIMENT

Figure 1:
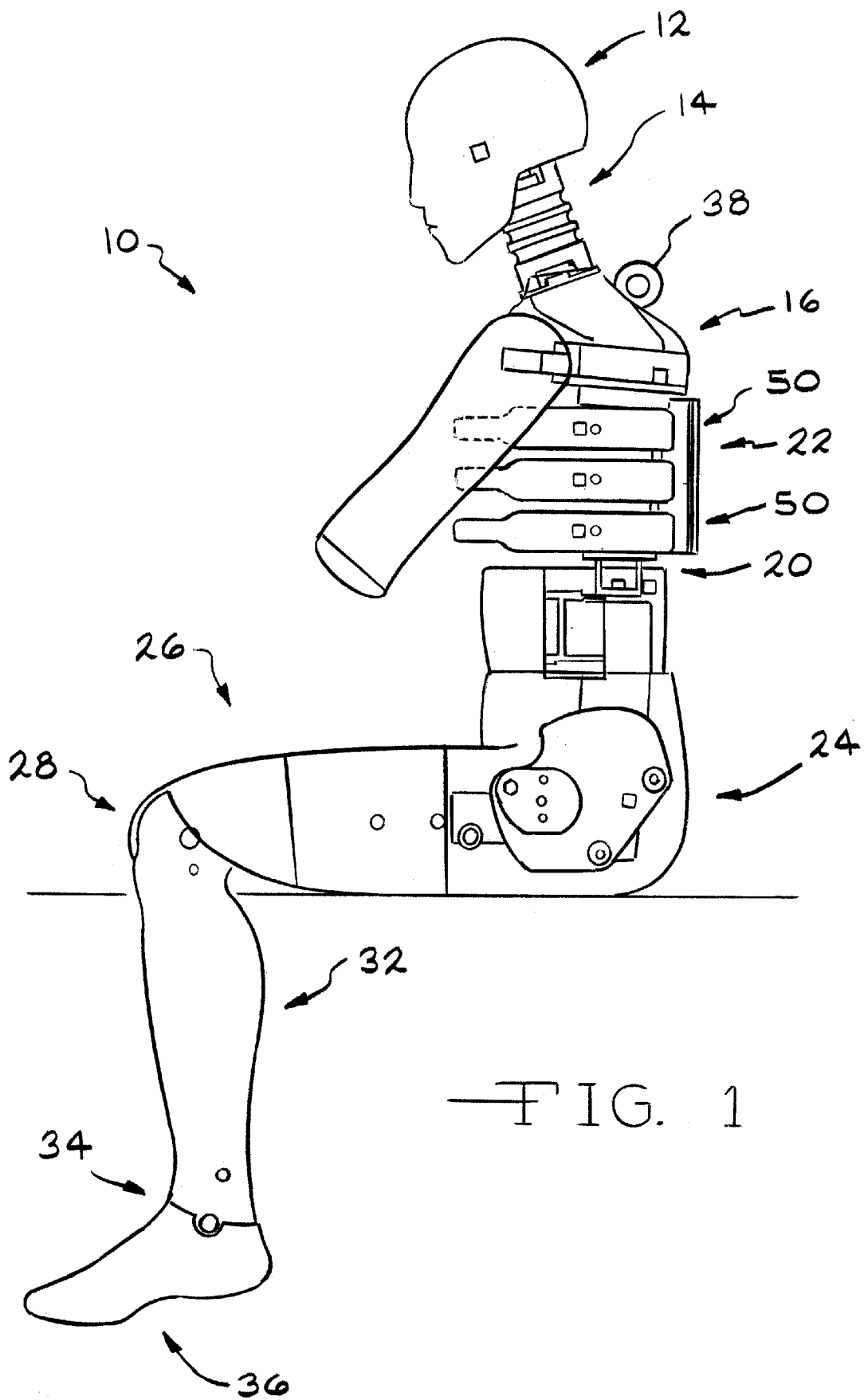
FIG. 1 is a side elevational view of a crash test dummy incorporating the present invention.

A crash test dummy incorporating the present invention is illustrated and generally designated by the reference numeral 10. The crash test dummy illustrated is generic and representative of various devices approved and accepted by various regulatory authorities or manufactured under various trademarks by diverse manufacturers. The crash test dummy, from top to bottom, includes a head assembly 12, a neck assembly 14, a shoulder assembly 16 coupled to opposed, symmetrical arm assemblies 18 and a spine assembly 20. Coupled to the spine assembly is a rib cage assembly 22 and a hip assembly 24. In turn, the hip assembly 24 is secured to a symmetrical pair of thigh assemblies 26, a pair of knee assemblies 28, a pair of calf or lower leg assemblies 32, a pair of ankle assemblies 34 and a pair of foot assemblies 36. A lifting eyelet 38 secured to the rear portion of the shoulder assembly 16 facilitates moving and positioning of the crash test dummy 10 as will be readily appreciated.

Figure 2:
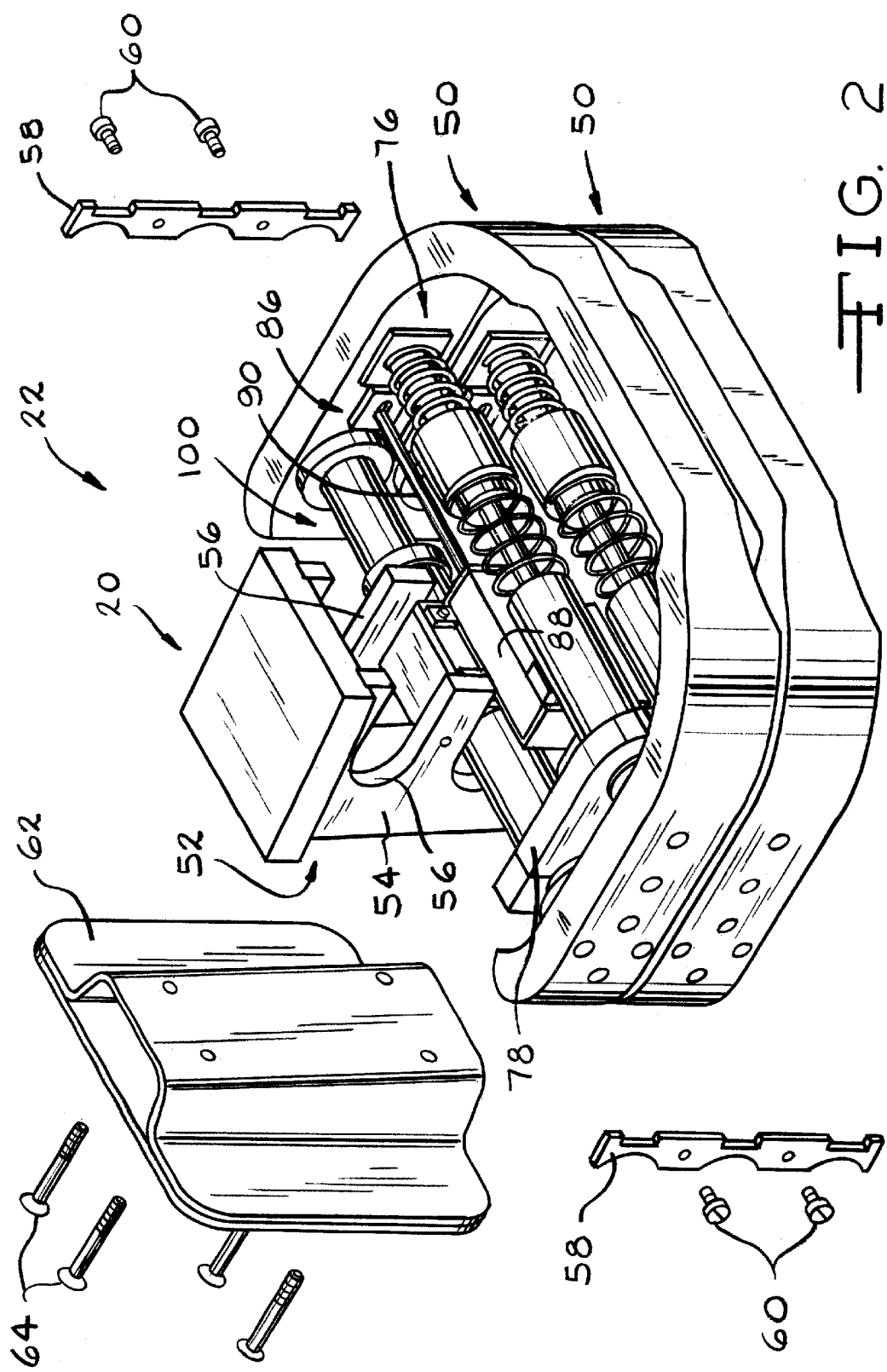
FIG. 2 is perspective view of a rib cage assembly according to the prior art.

Referring now to FIG. 2, the rib cage assembly 22 includes a plurality, preferably three, rib assemblies 50 which are received within a mounting rack 52 which is a portion of the spline assembly 20. For purposes of clarity, the uppermost rib assembly 50 has been removed in FIG. 2. The mounting rack 52 includes parallel, laterally spaced-apart plates 54 which define U-shaped slots 56. The U-shaped slots 56 each receive and support a respective one of the rib assemblies 50. The rib assemblies 50 are retained within the U-shaped slots 56 by a pair of retaining members 58 which are secured to the parallel plates 54 by threaded fasteners 60 or other securable and removable fasteners. The mounting rack 52 is, in turn, retained upon the spline assembly 20 by a mounting frame 62 which is secured to the mounting rack 52 by a plurality of fasteners 64.

Figure 3:
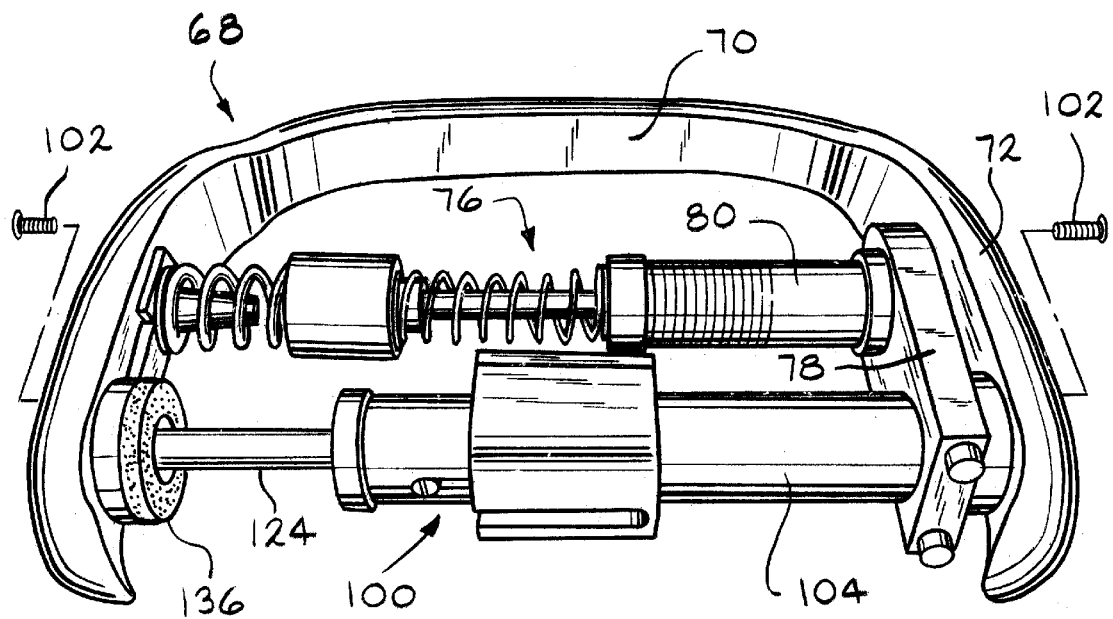
FIG. 3 is a perspective view of a single rib assembly incorporating the present invention.
Figure 4:
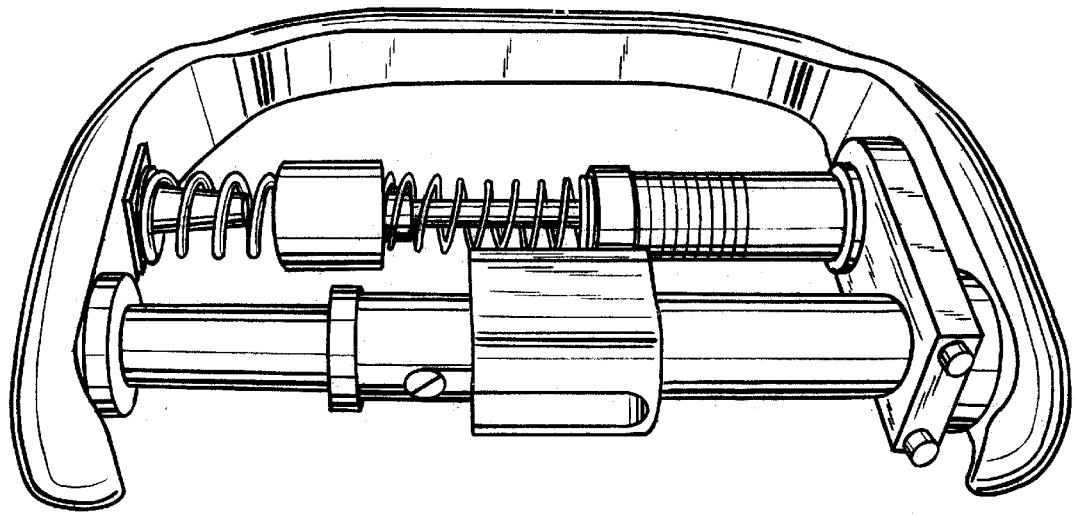
FIG. 4 is a perspective view of a prior art single rib assembly.

Turning now to FIGS. 2 and 3, it will be appreciated that each of the three rib assemblies 50 include a U-shaped frame or saddle 68 which mimics the ribs of a human being. The frame or saddle 68 includes an inner formed metal band 70 and an outer semi-circular region 72 of resilient elastomeric material which may be silicon rubber. Extending between the sides of the frame or saddle 68 are structures which provide a simulated dynamic response to motion and impact by each of the rib assemblies 50. A spring biased damper or dashpot assembly 76 extends from one inner wall of the metal band 70 to an offset bracket 78. The dashpot assembly 76 includes a fluid damper or dashpot 80 having a piston which is acted upon by a pair of opposed compression springs 82.

Also extending between the metal band 70 and the offset bracket 78 is a linear translation sensor assembly 86. The linear translation sensor assembly 86 includes a sensor housing 88 and a sensing rod or piston 90 which extends from the housing 88. Increase or decrease of the distance between the metal band 70 and the offset bracket 78 repositions the sensing piston or rod 90 relative to the housing 88 and provides a variable signal or output in electrical leads (not illustrated) which connect the sensor assembly 86 to associated data collection equipment. In real time, the linear translation sensor assembly 86 detects motion. Since the data is gathered over time, motion or translation per unit time, i.e., speed, is also readily available. Furthermore, this data may be differentiated to deduce acceleration.

Figure 5:
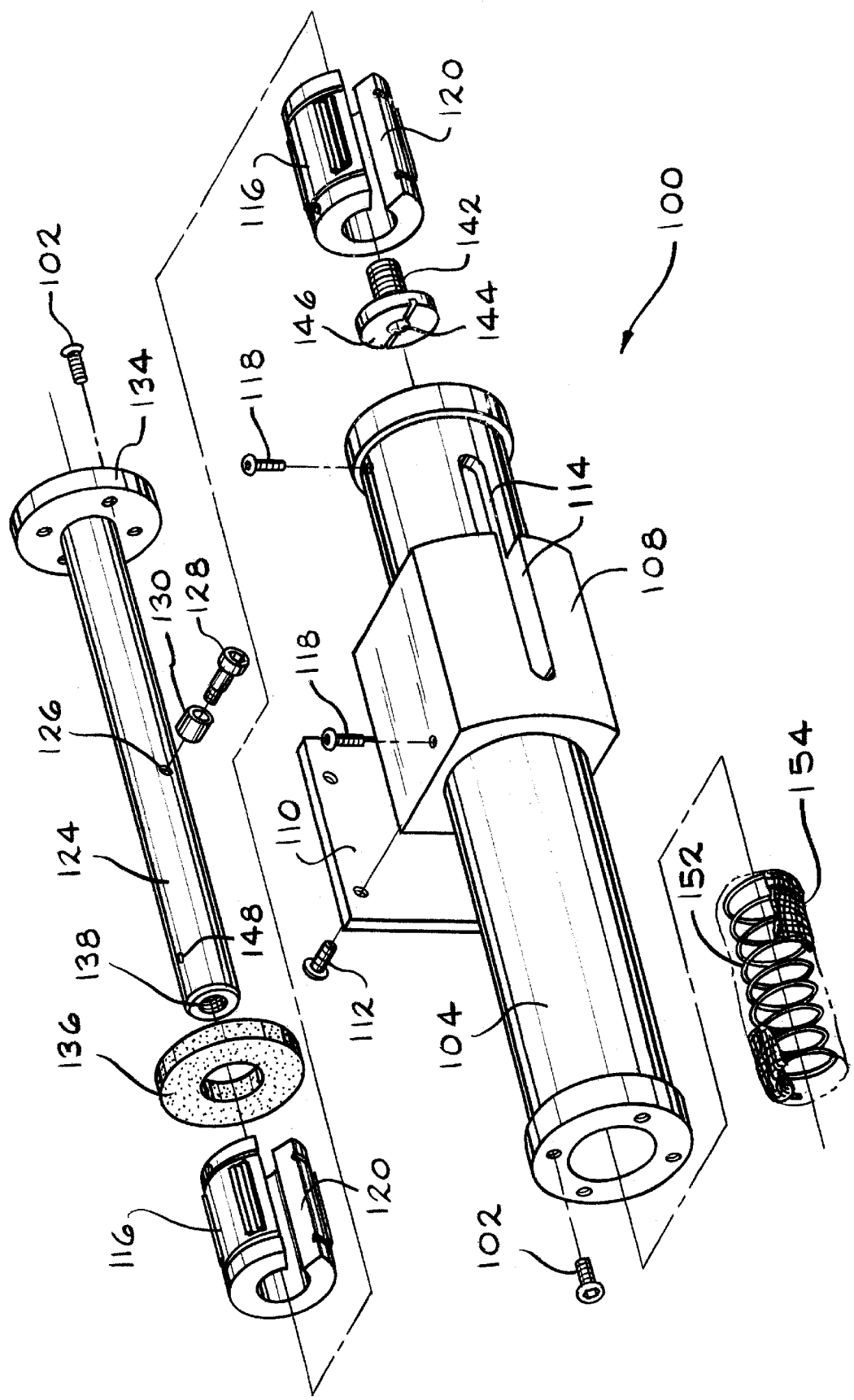
FIG. 5 is an exploded, perspective view of a rib displacement assembly according to the present invention.

Referring now to FIGS. 3 and 5, the rib assembly 50 also includes a piston and cylinder assembly 100. The piston and cylinder assembly 100 extends across the rib assembly 68 and is secured to the inner metal band 70 by pluralities of fasteners 102. The piston and cylinder assembly 100 includes an elongate cylinder 104 defining a through passageway 106. Generally centrally disposed along the length of the elongate cylinder 104 is a mounting block 108 which facilitates axial location of the piston and cylinder assembly 100 within the mounting rack 52 as illustrated in FIG. 2. The mounting block 108 includes a removable rear plate 110 which is secured to the mounting block 108 by a plurality of threaded fasteners 112. The offset bracket 78 is secured about one end of the elongate cylinder 104.

An axially extending slot 114 is formed within a portion of the wall of the cylinder 104 and extends as well into a portion of the mounting block 108. A pair of open type, i.e. slotted, linear ball bushing bearings 116 are received within the through passageway 106 of the cylinder 104. One of the ball bushing bearings 116 is located generally adjacent the end of the cylinder 104 having the axial slot 114 and the other ball bushing bearing 116 is located generally intermediately along the length of the passageway 106. The ball bearing bushings 116 may be retained in these locations by suitable means such as snap rings or threaded fasteners such as set screws 118. As illustrated, the ball bushing bearings 116 are C-shaped in cross section and define open or through axial slots 120.

An elongate piston 124 is freely slidably received within the ball bushing bearings 116. Generally centrally disposed along the length of the elongate piston 124 is a threaded radial opening 126 which receives a cap screw 128. The cap screw 128 includes conventional threads and a bushing portion 130 which receives a rotatable sleeve or collar 132. The piston 124 terminates in a circular flange 134 which receives a plurality of mounting screws 102 which thereby secure it to the metal band 70 of the rib assembly 68. A resilient flat washer 136 fabricated of an elastomeric material is secured to the inside face of the flange 134 and acts as a limit stop or bumper to prevent the cylinder 104 from bottoming out on the flange 134 during violent lateral translation.

The end of the piston 124 opposite the flange 134 defines a threaded aperture 138 which receives a threaded cap screw 142. The threaded cap screw 142 defines a through axial passageway 144 and an enlarged head 146. The through axial passageway 144 communicates with a radial bleed aperture 148 which relieves air pressure which would otherwise build up during axial translation of the piston 124. The enlarged head 146 of the cap screw 142 abuts a helical compression spring 152. The compression spring 152 provides resistance to translation of the piston 124 relative to the cylinder 104 as will be readily appreciated. The compression spring 152 is preferably surrounded by a fabric sleeve 154 which reduces friction and facilitates smooth translation of the compression spring 152 within the passageway 106 of the cylinder 104.

In operation, the rib assemblies 50 provide improved duplication of the responses to impact of a human rib cage in crash tests. This improved response is primarily the result of the ball bushing bearings 116 which, because they are significantly less susceptible to increased friction and possible seizing caused by cocking or misalignment of the piston 124 within the passageway 106 of the cylinder 104, provide greatly improved maintenance of the desired positions of the associated components such as the frame or saddle 68 and also ensures on-axis movement of the piston 124 within the cylinder 104 thereby assuring that each of the rib assemblies 50 operate as intended and that the linear translation sensor assembly 86 likewise operates as intended and provides the desired data.

The foregoing disclosure is the best mode devised by the inventors for practicing this invention. It is apparent, however, that apparatus incorporating modifications and variations will be obvious to one skilled in the art of crash test dummies. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

We claim:

1. A rib assembly for a crash test dummy comprising, in combination, a U-shaped rib member having a central portion and two opposed, spaced-apart side portions, a damper assembly extending between and secured to said side portions, and a piston and cylinder assembly extending between and secured to said side portions, said piston and cylinder assembly having a cylinder member, a piston received in said cylinder member and a pair of ball bearing assemblies operably disposed between said piston and said cylinder member.

2. The rib assembly of claim 1 further including a linear displacement sensor operably disposed between said side portions.

3. The rib assembly of claim 1 wherein said damper assembly includes a dashpot and a pair of opposed compression springs.

4. The rib assembly of claim 1 wherein said U-shaped rib member includes an inner metal band and an outer resilient covering.

5. The rib assembly of claim 1 further including a compression spring operably assembly disposed in said piston and cylinder assembly.

6. The rib assembly of claim 1 wherein said ball bearing assemblies includes a longitudinal through slot.

7. The rib assembly of claim 1 further including a radial member extending from said piston for inhibiting rotation of said piston.

8. A rib assembly for a crash test dummy comprising, in combination, a rib member having a central portion and two opposed, spaced-apart curved side portions, a damper assembly extending between said side portions, and a cylinder member secured to one of said side portions, an elongate piston secured to another of said side portions and received in said cylinder member and, a pair of ball bearing assemblies operably disposed between said elongage piston and said cylinder member.

9. The rib assembly of claim 8 wherein a plurality of rib assemblies are disposed in a crash test dummy.

10. The rib assembly of claim 8 further including a linear displacement sensor operably disposed between said side portions.

11. The rib assembly of claim 8 wherein said damper assembly includes a dashpot and a pair of opposed compression springs.

12. The rib assembly of claim 8 further including a compression spring operably disposed between said piston and said cylinder member.

13. The rib assembly of claim 8 wherein said ball bearing assemblies include a longitudinal slot.

* * * * *